US009273937B2

(12) United States Patent
Kang et al.

(10) Patent No.: US 9,273,937 B2

(45) Date of Patent: Mar. 1, 2016

(54) RADAR REFLECTOR OPERATING DEVICE FOR INDICATING EMERGENCY POSITION

(71) Applicant: Korea Institute of Ocean Science & Technology, Ansan-si (KR)

(72) Inventors: Hee-Jin Kang, Gyeryong-si (KR); Dong-Kon Lee, Daejeon (KR)

(73) Assignee: KOREA INSTITUTE OF OCEAN SCIENCE & TECHNOLOGY, Ansan (KR)

( * ) Notice: Subject to any disclaimer, the term of this patent is extended or adjusted under 35 U.S.C. 154(b) by 0 days.

(21) Appl. No.: 14/006,288

(22) PCT Filed: Oct. 8, 2012

(86) PCT No.: PCT/KR2012/008120
§ 371 (c)(1),
(2) Date: Sep. 19, 2013

(87) PCT Pub. No.: WO2014/046331
PCT Pub. Date: Mar. 27, 2014

(65) Prior Publication Data

US 2015/0191231 A1 Jul. 9, 2015

(30) Foreign Application Priority Data

Sep. 24, 2012 (KR) ........................ 10-2012-0105618

(51) Int. Cl.
*F41J 2/00* (2006.01)
*H01Q 15/16* (2006.01)
(Continued)

(52) U.S. Cl.
CPC ... *F41J 2/00* (2013.01); *B63C 9/13* (2013.01); *B63C 9/155* (2013.01); *B63C 9/20* (2013.01); *B63C 9/21* (2013.01); *H01Q 15/163* (2013.01)

(58) Field of Classification Search
CPC ................................ H01Q 15/163; F41J 2/00
See application file for complete search history.

(56) References Cited

U.S. PATENT DOCUMENTS 3,229,290 A * 1/1966 Fisher ........................ F41J 2/00 102/354
3,229,291 A * 1/1966 Dell Aria .............. B63B 22/003 102/348

(Continued)

FOREIGN PATENT DOCUMENTS

FR 2497003 A1 * 6/1982 ............. H01Q 1/082
IT EP 1902938 A2 * 3/2008 ............ B63B 22/003

(Continued)

OTHER PUBLICATIONS

International Search Report for PCT/KR2012/008120 mailed Mar. 28, 2013.

*Primary Examiner* — Matthew M Barker

(57) ABSTRACT

A radar reflector operating device for indicating an emergency position, capable of permitting a victim to indicate his location by means of a radar reflector even when he is dropped into seawater without a life jacket, easily actuating the radar reflector by pulling or pressing a switch even when low seawater temperature dulls a victim's consciousness and senses of fingers, arms, etc., maintaining an operation of the radar reflector due to safety means even without sustenance of power by a victim that applies power in a predetermined level to operate the radar reflector, allowing an appropriate reflection section and distant recognition by preventing the radar reflector with hydrodynamic wings from being lowered due to wind, etc., and securing a victim, who cannot swim, against dangerous environments by rendering him to use the radar reflector as a life buoy, holding the wings by hands to float on the sea.

16 Claims, 12 Drawing Sheets

(51) Int. Cl.

| | |
|---|---|
| ***B63C 9/13*** | (2006.01) |
| ***B63C 9/15*** | (2006.01) |
| ***B63C 9/20*** | (2006.01) |
| ***B63B 45/00*** | (2006.01) |

(56) References Cited

U.S. PATENT DOCUMENTS

| | | | | | |
|---|---|---|---|---|---|
| 4,482,333 | A * | 11/1984 | Geri | B63C 9/23 | 340/539.1 |
| 4,696,252 | A * | 9/1987 | Grill | B64B 1/40 | 116/210 |
| 5,536,191 | A * | 7/1996 | Lin | G08B 5/002 | 441/106 |
| 5,582,127 | A * | 12/1996 | Willis | B64B 1/40 | 116/210 |
| 6,109,203 | A * | 8/2000 | Mears | B63C 9/0005 | 116/210 |
| 6,359,568 | B1 * | 3/2002 | Johnson | B63C 9/21 | 116/210 |

FOREIGN PATENT DOCUMENTS

| | | | |
|---|---|---|---|
| JP | 2002-024950 | A | 1/2002 |
| JP | 2002-029493 | A | 1/2002 |
| KR | 10-0358331 | B1 | 1/2003 |
| KR | 10-0999442 | B1 | 12/2010 |

* cited by examiner

<Prior Art>

<Prior Art>

RADAR REFLECTOR OPERATING DEVICE FOR INDICATING EMERGENCY POSITION

CROSS-REFERENCE TO RELATED APPLICATION

This application claims priority under 35 U.S.C. §119 to Korean Patent Application No. 10-2012-0105618 filed on Sep. 24, 2012, the disclosure of which is hereby incorporated by reference in its entirety.

BACKGROUND

1. Field

Embodiments of the inventive concept relate to a radar cross section reflector for indicating an emergency position.

2. Description of Related Art

Safety Of Life At Sea (SOLAS) proposes that a radar cross section (RCS) for recognizing an object on the sea should be 10 $m^2$ and obligates that the RCS should be equipped in vessels so as to prevent a clash between small and large vessels.

An RCS is proposed with its verified result for a typical radar reflector and can be largely extended in a multi-hedral structure such as a di-hedral or tri-hedral structure.

FIG. 11 shows a basic theory about the RCS. According to the theory, it can be seen that in a radar reflector on which a di-hedral or tri-hedral metal films, a tri-hedral radar reflector having one side of 1 for a radar wave of a conventional 3 GHz band is equipped with an RCS over 3500 times of a spherical metal reflective surface having a radius of 1 and even over 3 times of a planar metal reflective surface.

Therefore, when there is emergency at sea, utilizing the characteristics of such a radar reflector helps a victim to effectively indicate his emergency position to a vessel or relief squad, which is passing by, by means of the radar reflector.

With regard to this view, the present applicant made the application (Application No. 10-2008-0050410) at May 29, 2008, entitled "Emergency position indicating device using RCS (Radar Cross Section) characteristics" (hereinafter referred to as 'related art'), which was issued for patent at Dec. 2, 2010 (Patent No. 10-0999442) (see FIG. 12).

The related art is provided to solve a problem that makes it difficult to find a victim's position when there is an emergency on the sea. According to the related art, it is possible to quickly find an emergency position in the daytime or nighttime regardless of marine environments, overcoming the shortness arising from an Emergency Position Indicating Radio Beacon (EPIRB) that operates a large error bound of 4 mile and a cyalume lightstick limited in indication range. Referring to the related art, to effectively indicate an emergency position, radar emitted from a vessel or relief squad passing by the emergency position is intensively reflected on a balloon-type device embedding a radar reflector on which a di-hedral or tri-hedral metal film is covered to maximize an RCS, or on a self-floating radar reflector, while the device or the self-floating reflector is floating for a long time over the emergency position in a sufficient height 10~30 m after injecting a gas, which is lighter than air, thereinto.

While the related art, operable by attaching an EPIRB, which includes a radar reflector, to a life jacket, is theoretically capable of indicating an emergency position in the daytime or nighttime regardless of marine environments, there would be inconvenience or limits as follows in operation for actual emergency on the sea.

First, in an actual case of emergency on the sea, victims are usually dropped into seawater without wearing life jackets beforehand. Since most victims are incapable of swimming, the utility of the related art would be lower.

Second, if seawater temperature is low, a victim's consciousness rapidly goes down and senses of fingers, arms and legs dull to cause their movement to be hard. As a result, it would be difficult to operate a device of the related art for indicating his emergency position.

Third, the lack of means for safely operating a device of the related art would cause a victim to be damaged if the device malfunctions in emergency. And, if some important components of the device of the related art get out of order, it cannot be used.

Fourth, while a radar reflector needs to be floated over an appropriate height for providing a proper reflection section and securing distant recognition, the device of the related art may be floated lower than a desired height due to wind.

SUMMARY

Embodiments of the inventive concept provide a radar reflector operating device for indicating an emergency position, capable of permitting a victim to indicate his location by means of a radar reflector even when he is dropped into seawater without a life jacket, easily actuating the radar reflector by simply pulling or pressing a switch even when low seawater temperature dulls a victim's consciousness and senses of fingers, arms, etc., maintaining an operation of the radar reflector due to safety means even without sustenance of power by a victim once the victim applies power in a predetermined level to operate the radar reflector, allowing an appropriate reflection section and distant recognition by preventing the radar reflector, to which hydrodynamic wings is attached, from being lowered due to wind, etc., and securing a victim, who cannot swim, against dangerous environments by rendering him to use the radar reflector as a life buoy and hold the wings by hands to float on the sea.

In accordance with an aspect according to embodiments of the inventive concept, a radar reflector operating device for indicating an emergency position includes: a case including an accommodation space; a pull trigger accommodated in the inside of the case and fixedly caught on a first detent installed in the case; a compressed air container configured to store a compressed gas and include a gad jet, and accommodated in the inside of the pull trigger, the gas jet being connected to a gas ejection nozzle that is installed at a through hole of the pull trigger; a radar reflector made of a flexible material and accommodated in the inside of the case in a winkle type like a zabara, including a gas injection nozzle that is placed at one end of the body and closely connected to the gas ejection nozzle, configured to inflate and secede from the inside of the case if the compressed gas is injected through the gas injection nozzle float, and float in the air; a connection cable configured to connect the case 1 with the radar reflector; a pull switch connected to the pull trigger and configured to pull the pull trigger to allow the gas ejection nozzle to enter at the gas jet; and a press switch installed at the case and configured to press the compressed air container to allow the gad jet to enter at the gas ejection nozzle.

The technical objectives of the inventive concept are not limited to the above disclosure; other objectives may become apparent to those of ordinary skill in the art based on the following descriptions.

BRIEF DESCRIPTION OF THE DRAWINGS

The foregoing and other features and advantages of the inventive concepts will be apparent from the more particular description of preferred embodiments of the inventive concepts, as illustrated in the accompanying drawings in which like reference characters refer to the same parts throughout the different views. The drawings are not necessarily to scale, emphasis instead being placed upon illustrating the principles of the inventive concepts. In the drawings.

DETAILED DESCRIPTION OF THE EMBODIMENTS

Figure 1:
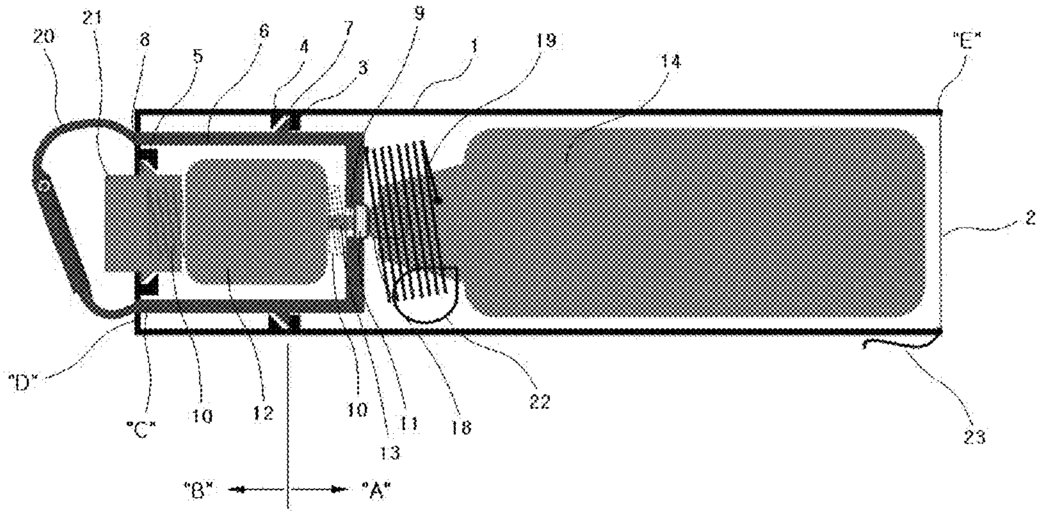
FIG. 1 illustrates a feature that a radar reflector is accommodated in a case in accordance with embodiments of the inventive concept.

Various embodiments will now be described more fully with reference to the accompanying drawings in which some embodiments are shown. These inventive concepts may, however, be embodied in different forms and should not be construed as limited to the embodiments set forth herein. Rather, these embodiments are provided so that this disclosure is thorough and complete and fully conveys the inventive concept to those skilled in the art. In the drawings, the sizes and relative sizes of layers and regions may be exaggerated for clarity.

The terminology used herein is for the purpose of describing particular embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-sectional illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 illustrates a detailed configuration of a radar reflector operating device for indicating an emergency position in accordance with embodiments of the inventive concept, including a case 1, a pull trigger 6, a compressed gas container 12, a radar reflector 14, a connection cable 19, a pull switch 20 and a press switch 21. As shown in FIG. 1, the radar reflector 14 is normally folded and preserved in the case 1.

Referring to FIG. 1, as the case 1 has a preservation space in the inside, the pull trigger 6, the compressed gas container 12, the radar reflector 14 and the connection cable 19 are accommodated in the inside of the case 1. While the case 1 is normally shaped in a cylinder, it may have another shape but a cylinder. It is preferred to make the case 1 with a firm material not to be easily broken down due to even an impact occurring in emergency.

One end of the case 1 (E of FIG. 1) is open, which is provided to allow the radar reflector 14 to inflate and secede from the inside of the case 1 when injecting a compressed gas thereinto as described later. If the end E of the case 1 is fully open from the beginning, the radar reflector 14 may not normally operate in emergency because of impurities or humidity in the inside of the case 1. For that reason, it is desirable to put a sodium alginate cover 2 over the open end E of the case 1. The sodium alginate 2 forms a film in a dry state and melts away by water.

The pull trigger 6 is fixedly caught by a first detent 3 in the inside of the case 1, fixedly caught by a first detent 3. This fixation of the pull trigger 6 means that the pull trigger 6 maintains an unmovable state as long as no power is applied thereto, not permanently fixed to the case 1 so as to be unmovable anyway. In other words, if power is applied to the pull trigger 6, the fixed part thereof can be released to move the pull trigger 6.

Continued to this feature, as illustrated in FIG. 1, the pull trigger 6 includes a first projection 7, which can be caught on the first detent 3, at the outside of the body. The first projection 7 is formed in right triangle section and the first detent 3 is formed in tetragonal section. The pull trigger 6 is fixed within the case 1 when a vertical surface of the first projection is caught on the first detent 3. It can be seen from FIG. 1 that if power is applied to the pull trigger 6, the pull trigger 6 is blocked to move toward direction A due to the first detent 3, but can move toward direction B. To make the pull trigger 6 move toward direction B, end C of the pull trigger 6 must be protruded out of the case 1 (see FIG. 2), for which end D of the case 1 is equipped with a through hole 9 to allow the pull trigger 6 to protrude out of the case 1.

The compressed gas container 12, as a receptacle for containing a compressed gas such as helium, includes a gas jet 13 for exhausting the compressed gas to the outside. The compressed gas container 12 is accommodated in the pull trigger 6, as shown in FIG. 1, and supported by a spring 10 in an interval from the inner side of the pull trigger 6. With this condition, the gas jet 13 of the compressed gas container 12 is connected to a gas ejection nozzle 11 installed at the through hole 9 of the pull trigger 6.

In this structure, if predetermined power (this means an action to pull the pull switch 20 or press the press switch 21) is applied to make the gas ejection nozzle 11 enter at the gas jet 13 or reversely make the gas jet 13 enter at the gas ejection nozzle 11, the gas ejection nozzle 11 operates to press the compressed gas container 12 connected with the gas jet 13. Then, the compressed gas is released from the compressed gas container 12, passing through the gas ejection nozzle 11. The compressed gas passing through the gas ejection nozzle 11 is finally injected into the radar reflector 14 by way of a gas injection nozzle 18 that will be described later.

Figure 4:
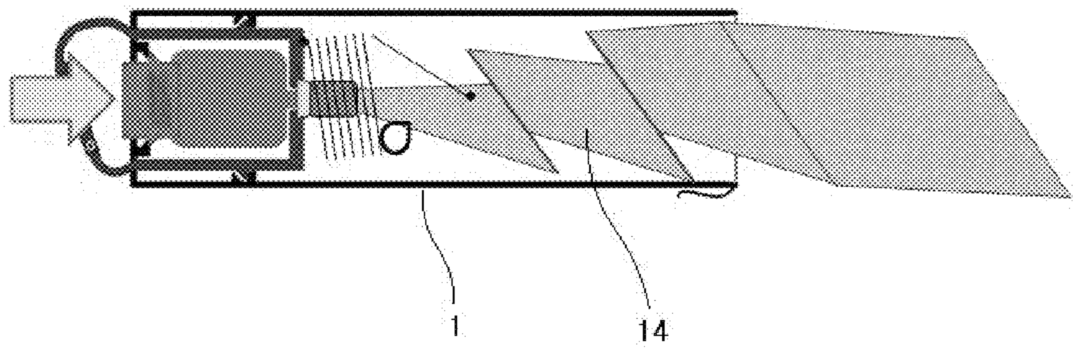
FIG. 4 illustrates a procedure that the radar reflector containing the compressed gas abruptly inflates to secede from the inside of the case in accordance with embodiments of the inventive concept.

As the radar reflector 14 is made up of a flexible material, it is folded in the case 1 in a wrinkled state (called a 'zabara' type in Japanese) and the gas injection nozzle 18 installed at one end of the body is closely connected with the gas jet 11. As aforementioned, if the compressed gas is injected into the radar reflector 14 by way of the gas injection nozzle 18, the radar reflector 14 abruptly inflates to secede from the inside of the case 1 (in this case, the radar reflector 14 is pushed out of the case 1, for which its end folded in a wrinkled type as shown in FIG. 4 first inflates to be released out of the case 1 and during this, the gas injection nozzle 18 is separated from the gate jet 11) and float in the air. While floating in the air, radar emitted from a vessel or life squad passing by the emergency position is intensively reflected on the radar reflector 14 to effectively indicate the emergency position (see FIG. 5).

In a distress situation, a victim drifting about in the sea is able to inject the compressed gas into the radar reflector 14 even by using either the pull switch 20 or the press switch 21. This means that it is permissible for a victim to selectively operate the radar reflector 14 freely in correspondence with current conditions such as his poses, etc. in emergency.

Figure 2:
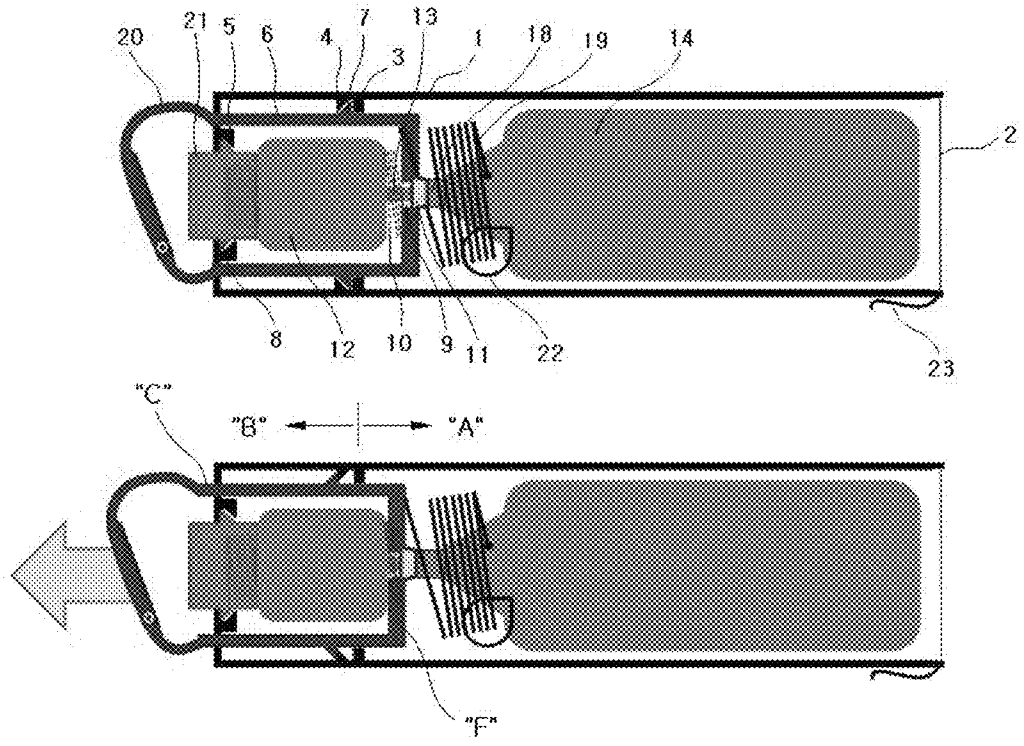
FIG. 2 illustrates a feature of injecting a compressed gas into the radar reflector by means of a pull switch in accordance with embodiments of the inventive concept.
Figure 3:
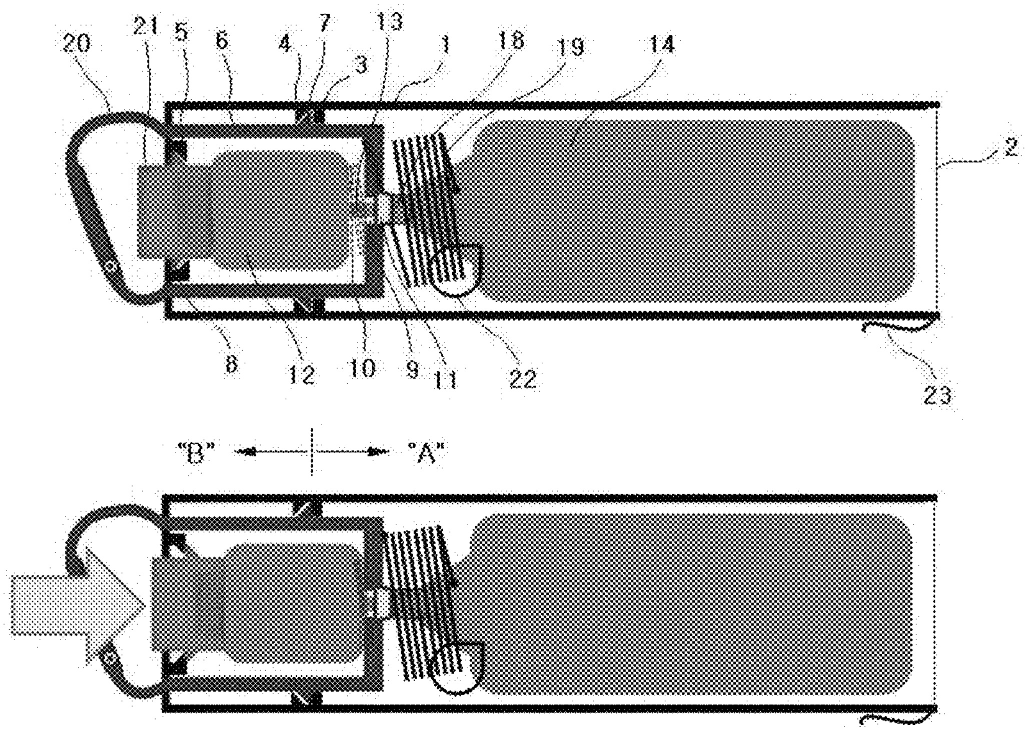
FIG. 3 illustrates a feature of injecting a compressed gas into the radar reflector by means of a press switch in accordance with embodiments of the inventive concept.

FIG. 2 illustrates a feature of injecting the compressed gas into the radar reflector 14 by means of the pull switch 20 in accordance with embodiments of the inventive concept. And FIG. 3 illustrates a feature of injecting the compressed gas into the radar reflector 14 by means of the press switch 21 in accordance with embodiments of the inventive concept.

Now first will be described the pull switch 20. As shown in FIG. 1, the pull switch 20 is connected to the pull trigger 6, acting to pull the pull trigger 6 so as to allow the gas ejection nozzle 11 to enter at the gas jet 13. FIG. 2 will be further referred to detail the mechanism of operating the pull switch 20. If a victim pulls the pull switch 20, the pull trigger 6 moves toward direction B. Accordingly, end C of the pull trigger 6 moves toward direction B to protrude out of the case 1. End F of the pull trigger 6 moves toward direction B to be close to the compressed gas container 12. During this, together with end F of the pull trigger 6, the gas ejection nozzle 11 enters at the gas jet 13 and presses the compresses gas container 12 connected with the gas jet 13. As a result, the compressed gas is released from the compressed air container 12 by way of the gas jet 13, passing through the gas ejection nozzle 11. The compressed gas passing through the gas ejection nozzle 11 is finally injected into the radar reflector 14 by way of the gas injection nozzle 18.

In this operation, as shown in FIG. 2, it is preferred to provide a second detent 4 in the inside of the case 1. The second detent 4 functions to fix, as it is, the pull trigger 6 that is being pulled. From the embodiments illustrated in FIG. 2, the second detent 4 is placed along direction B in a predetermined interval with the first detent 3. The second detent 4 is shaped in a right triangle section. A slope of the second detent 4 is normally conditioned to meet with a slope of the first projection 7 (if a victim does not pull the pull switch 20). Therefore, if a victim pulls the pull switch 20, the slope of the first projection 7 slides down the slope of the second detent 4 to allow the pull trigger 6 to move toward direction B. From this condition, even if the victim releases the pull switch 20, the pull trigger 6 cannot move again toward direction A. This is because the vertical surface of the first projection 7 is caught by a vertical surface of the second detent 4 to interrupt the movement of the pull trigger 6.

As aforementioned, with the second detent 4 installed in the inside of the case 1, the radar reflector 15 can be actuated only if a victim pulls the pull switch 20 with power over a predetermined level enough to overcome resistance of the second detent 4. Therefore, it is possible to preliminarily prevent the radar reflector 14 from being inadvertently actuated even in a non-emergent situation. Additionally, once the radar reflector 14 operates, it maintains its operating state although a victim does not continuously pulls the pull switch 20. Thus, a victim, anyone having power only capable of pulling the pull switch 20, can be helped by the radar reflector 14.

In the meantime, as shown in FIG. 2, the pull switch 20 is installed to protrude out of the case 1, but preferably formed in a loop. Therefore, even in an emergent condition without time to spare, a victim is able to easily identify and pull the pull switch 20. As also, even when a victim is going down in consciousness due to low seawater temperature and dulling with his fingers or arms to be restricted in motion, he is able to easily actuate the radar reflector 14 by simply pulling the pull switch 20. The pull switch 20 shaped in a loop may be fixedly hooked on a life jacket of a victim, preventing it from being lost on the sea.

Now will be described the press switch 21. Referring to FIG. 1, the press switch 21 is installed in the case 1. The press switch 21 acts to directly press the compressed air container 12, allowing the gas jet 13 to enter at the gas ejection nozzle 11. Hereinafter will be more detailed the mechanism of operating the press switch 21 in conjunction with FIG. 3. If a victim presses the press switch 21, the compressed air container 12 is pushed to move toward direction A due to the press switch 21. Then, the gas jet 13 enters at the gas ejection nozzle 11. The gas ejection nozzle 11 presses the compressed air container 12 connected to the gas jet 13. As a result, the compressed gas is released from the compressed air container 12 by way of the gas jet 13, passing through the gas ejection nozzle 11 (as also, during this, the pull trigger 6 is being fixed by the first detent 3). The compressed gas passing through the gas ejection nozzle 11 is finally injected into the radar reflector 14 by way of the gas injection nozzle 18.

In this case, as shown in FIG. 3, it is preferred to place a third detent 5 in the inside of the case 1. The third detent 5 functions to fix the press switch 21 as it is pressed. From the embodiments of FIG. 3, at the outer side of the press switch 21 is included a second projection 8 configured to be caught on a third detent 5. The second projection 8 is shaped in a right triangle section and the third detent 5 is also shaped in a right triangle section. A slope of the third detent 5 is normally conditioned to meet with a slope of the second projection 8 (if a victim does not press the press switch 21). Therefore, if a victim presses the press switch 21, the slope of the second projection 8 slides down the slope of the third detent 5 to allow the press switch 21 to move toward direction A. From this condition, even if the victim releases the press switch 21, the press switch 21 cannot move again toward direction B, because a vertical surface of the second projection 8 is caught on a vertical surface of the third detent 5 and thereby interrupted to move.

As aforementioned, if the third detent 5 is installed in the inside of the case 1, a victim must press the press switch 21 with power over a predetermined level enough to overcome resistance of the third detent 5 in order to actuate the radar reflector 14. Therefore, it is possible to preliminarily prevent the radar reflector 14 from inadvertent actuation even in a non-emergent situation. Additionally, although a victim does not continue to press the press switch 21 after once actuating the radar reflector 14, the radar reflector 14 maintains its operating state. Thus, anyone who has power capable of pressing the press switch 21, as a victim, can be easily helped by the radar reflector 14.

In the meantime, as illustrated in FIG. 3, while the press switch 21 is installed to protrude out of the case 1, it is preferred to place the press switch 21 in contact with the compressed air container 12. By installing the press switch 21 to protrude out of the case 1, a victim is able to easily identify and press the press switch 21 even in an urgent and emergent situation. Additionally, by placing the press switch 21 in contact with the compressed air container 12, it is possible to effectively push the compressed air container 12 with small power for pressing the press switch 21. Therefore, even when severe environments such as low seawater temperature cause a victim's consciousness to go down and dull motions of his fingers or arms, the victim is able to easily actuate the radar reflector 14 by simply pressing the press switch 21.

Figure 5:
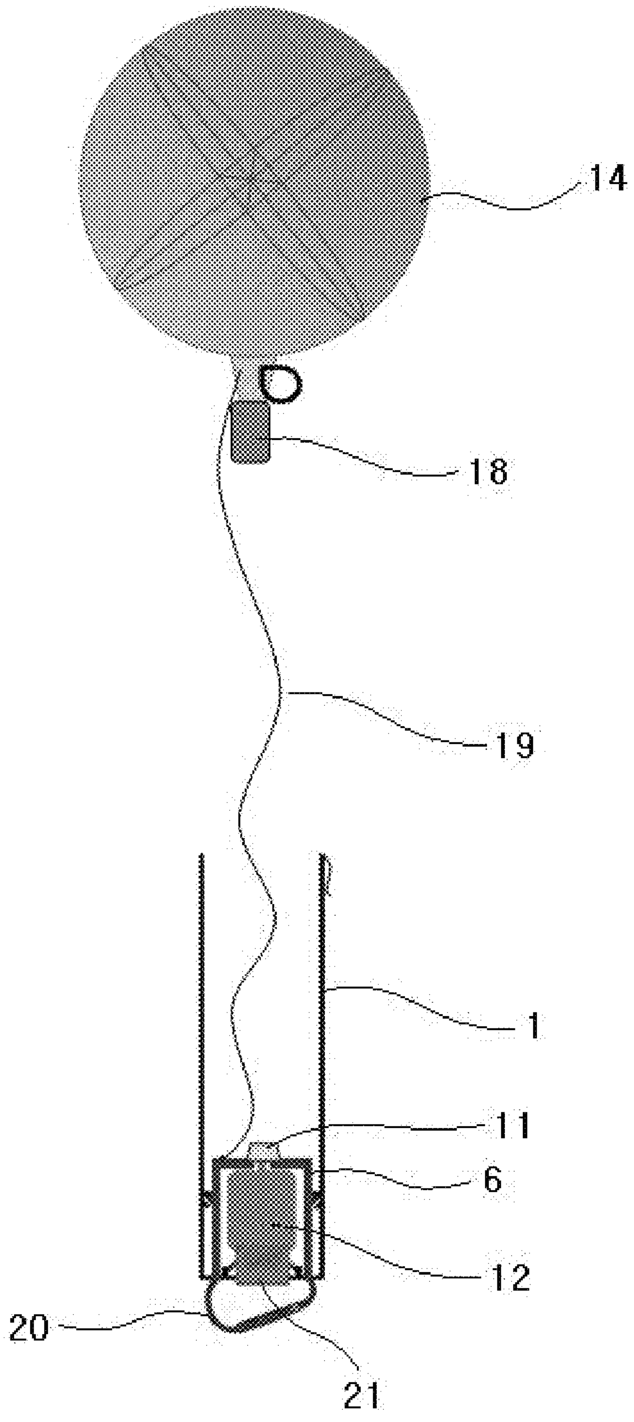
FIG. 5 illustrates a feature that the radar reflector containing the compressed gas is entirely floating in the air in accordance with embodiments of the inventive concept.
Figure 6:
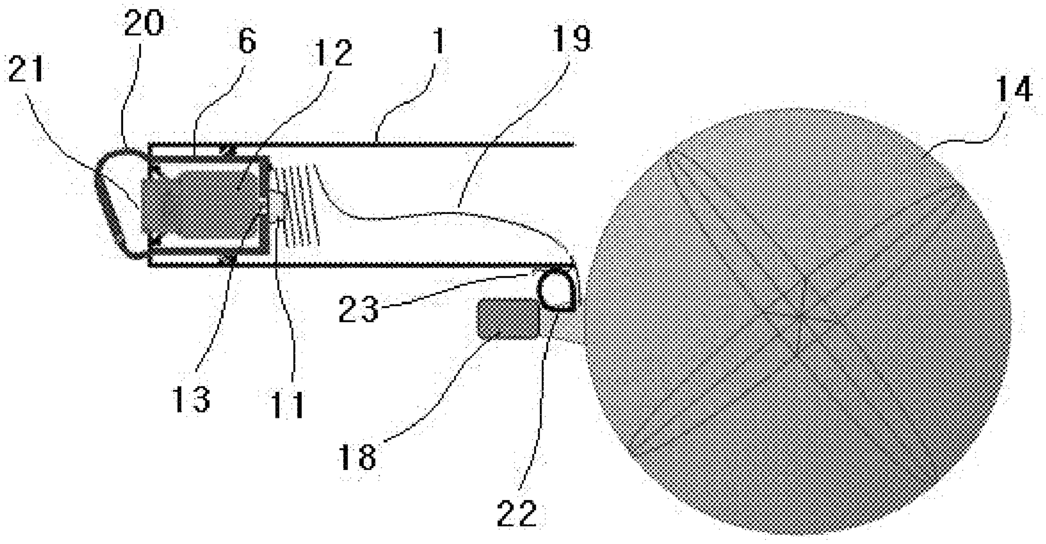
FIG. 6 illustrates a feature of fixing the radar reflector to the case in order to utilize the inflated radar reflector as a life buoy in accordance with embodiments of the inventive concept.
Figure 7:
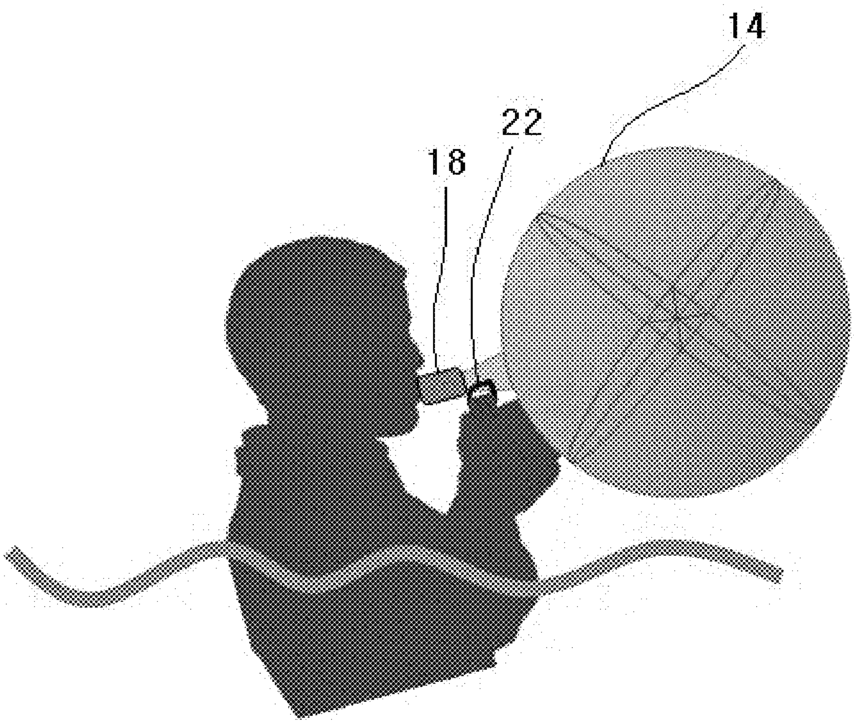
FIG. 7 illustrates a feature of manually injecting air into the radar reflector by a victim in accordance with embodiments of the inventive concept.

Even when the radar reflector 14 containing the compressed gas is floating in the air, it maintains a connection state to the case 1 by way of the connection cable 19 (see FIG. 5). The gas injection nozzle 18 acts as a unilateral valve to inhibit leakage of the compressed gas that is injected into the radar reflector 14. If the compressed gas has not been injected into the radar reflector 14 or is released from the radar reflector 14, a victim is able to blow air into the radar reflector 14 through the gas injection nozzle 18 and utilize the radar reflector 14 as a life buoy (see FIG. 7).

If the radar reflector 14 is utilized as a life buoy, even a non-swimmable victim is able to indicate his position by means of the radar reflector 14, while using the radar reflector 14 as the life buoy, when he has been dropped into water without a life jacket.

Figure 8:
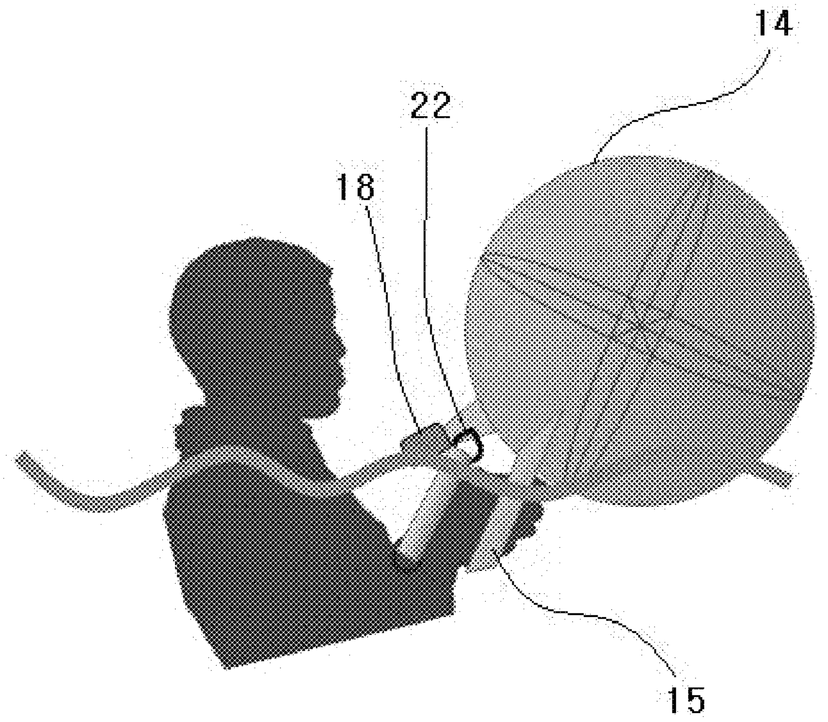
FIG. 8 illustrates a feature of utilizing the radar reflector as a life buoy by a victim in accordance with embodiments of the inventive concept.

With regard to the utilization of the radar reflector 14 for a life buoy, the radar reflector 14 may include a first loop 22 allowing the radar reflector 14 to hang on a certain object (see FIG. 1) and the case 1 may include a second loop 23 allowing the first loop 22 of the radar reflector 14 to hang thereon (see FIG. 1). The first loop 22 of the radar reflector 14 can be used as not only a handle when a victim blows air into the radar reflector 14 through the gas injection nozzle 18 (see FIG. 7), but also means for preventing a victim from losing the radar reflector 14, which is used as a life buoy, by suspending the radar reflector 14 from the victim's body (see FIG. 8). If it is impossible for a victim to directly suspend the radar reflector 14 from his body, the radar reflector 14 can be utilized as a life buoy by suspending the first loop 22 of the radar reflector 14 from the second loop 23 of the case 1 and holding the case 1. Additionally, if a victim fixes the case 1 to a life jacket by means of the second loop 23, it is possible to prevent a fatal miscarriage such as loss of the radar reflector 14 at the sea.

Figure 9:
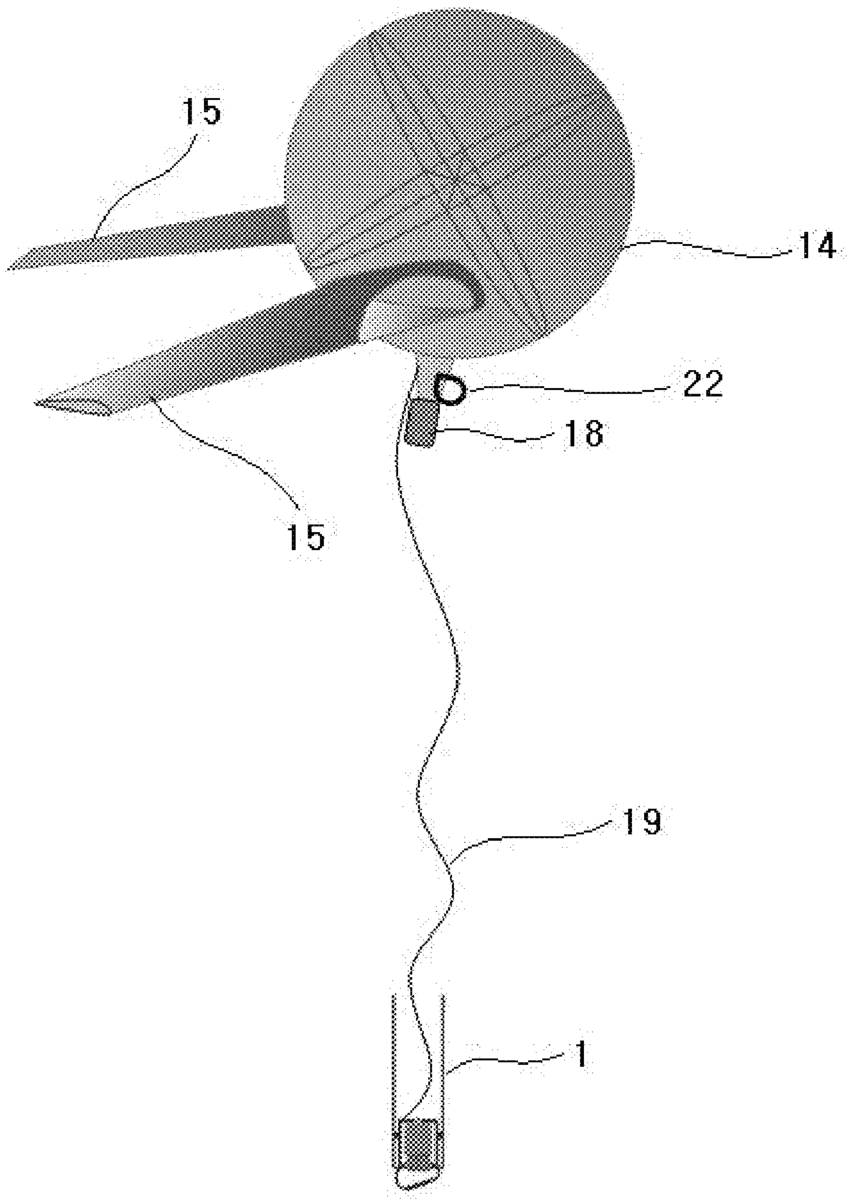
FIG. 9 illustrates a feature that the radar reflector is floating in the air with unfolded wings in accordance with embodiments of the inventive concept.

On the other hand, a wing (or wings) 15 is (are) provided to the radar reflector 14 (see FIG. 9). The wing 15 is made of a flexible material as same as the radar reflector 14. The wing 15 is attached to the radar reflector 14 and accommodated in the inside of the case 1 together with the radar reflector 14 in a folded state. While the radar reflector 14 inflates and floats in the air, the wing 15 spreads out together to maintain a floating height of the radar reflector 14 (see FIG. 9).

Figure 10:
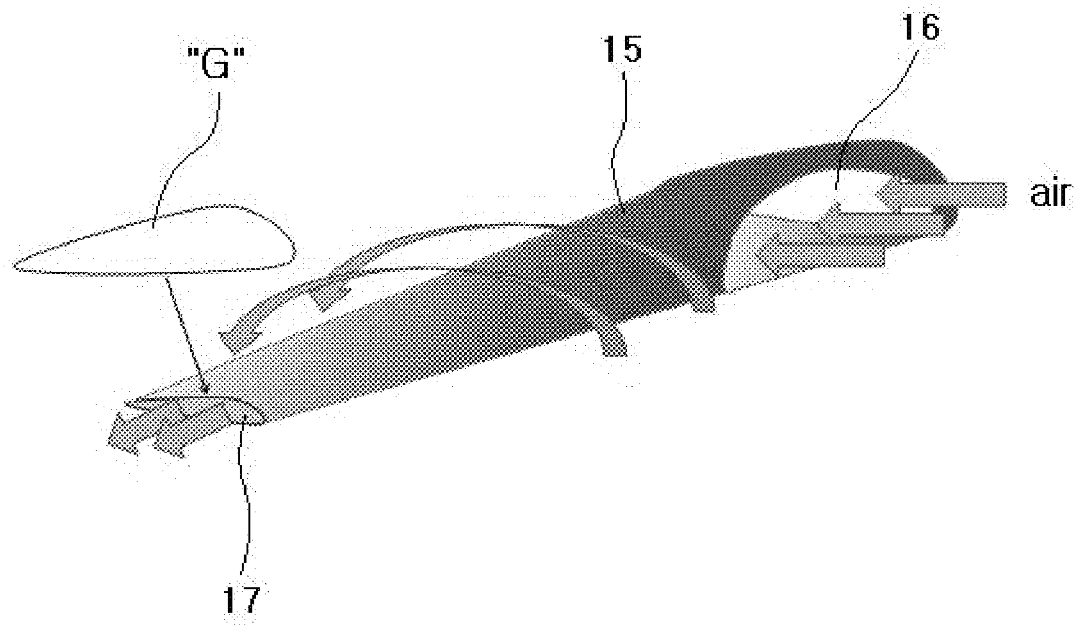
FIG. 10 illustrates a principle of forming hydrodynamic sections for generating lift on the wings attached to the radar reflector in accordance with embodiments of the inventive concept.
Figure 11:
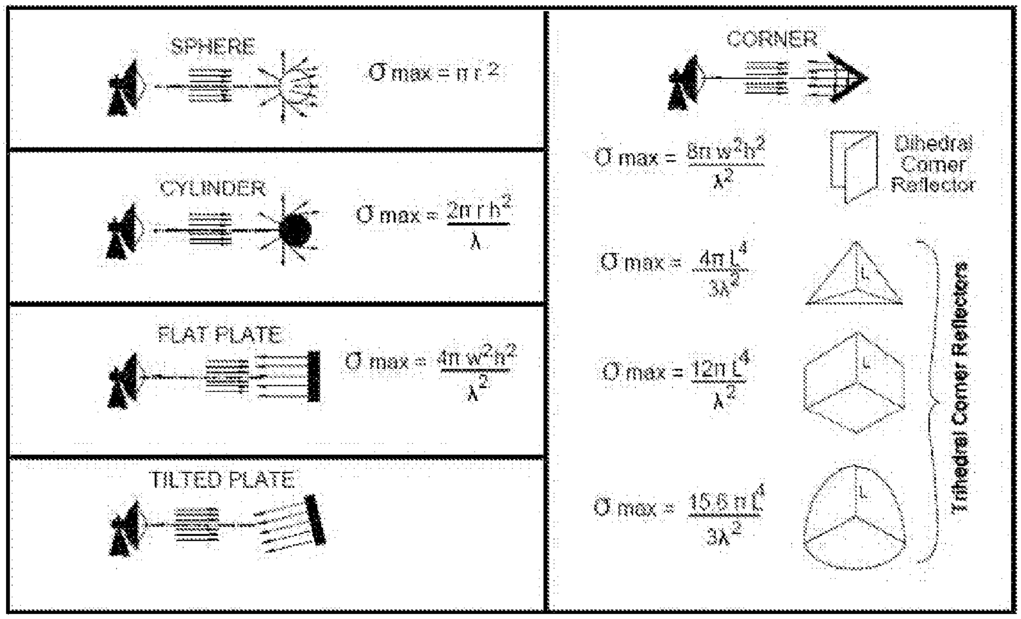
FIG. 11 shows a basic theory of an RCS.
Figure 12:
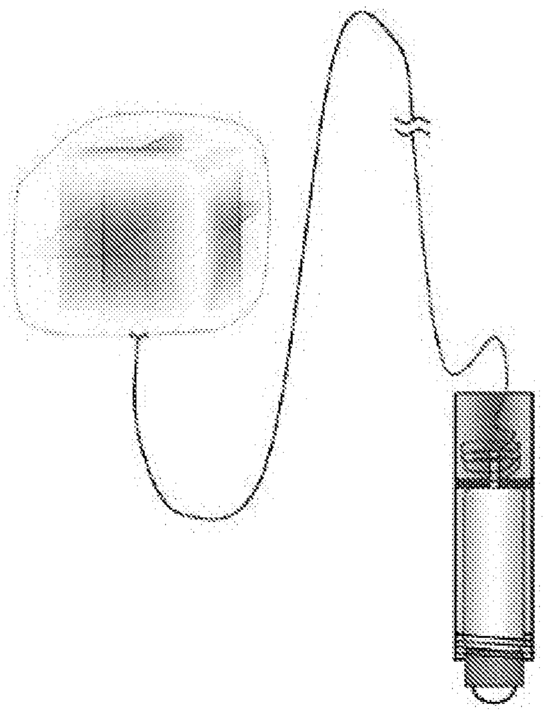
FIG. 12 shows a configuration of the related art (Patent No. 10-0999442) by the present applicant.

The spreading mechanism of the wing 15 attached to the radar reflector 14 is as follows. Referring to FIG. 10, the wing 15 includes an air inlet 16 for allowing air to be introduced thereinto. The wing 15 may include an air outlet 17 together for allowing air, which has flowed into the inside, to be exhaust to the outside. With this structure, while the wing 15 is floating in the air together with radar reflector 14, air flows into the wing 15 through the air inlet 16 and goes out of the wing 15 through the air outlet 17. These air inflow and outflow continue repetitively to form, what is called, an air pillar in the inside of the wing 15, hence spreading out the wing 15. If an area of a material forming the top of the wing 15 is designed to be larger than that of a material forming the bottom of the wing 15, the wing 15 has a hydrodynamic section (G of FIG. 10) that enables lift to be generated in the spread state.

As stated above, by attaching the hydrodynamic wing 15 to the radar reflector 14, the radar reflector 14 floating in the air is prevented from being lower to enable an appropriate reflection area and distant recognition. Moreover, as aforementioned, if the radar reflector 14 is utilized as a life buoy, a victim is able to use the wing 15 for preventing the radar reflector 14 from being lost, e.g. binding the radar reflector 14 to his body by means of the wing 15 or holding the wing 15 by hands (see FIG. 8).

The foregoing is illustrative of embodiments and is not to be construed as limiting thereof. Although a few embodiments have been described, those skilled in the art will readily appreciate that many modifications are possible in embodiments without materially departing from the novel teachings and advantages. Accordingly, all such modifications are intended to be included within the scope of this inventive concept as defined in the claims. In the claims, means-plus-function clauses are intended to cover the structures described herein as performing the recited function, and not only structural equivalents but also equivalent structures. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A radar reflector operating device, comprising:

a case including an accommodation space;

a pull trigger accommodated inside of the case;

a first detent disposed in the case and configured to prevent the pull trigger from moving in a first direction;

a compressed air container configured to store a compressed gas, the compressed air container including a gas outlet and being accommodated inside of the pull trigger, the gas outlet being connected to a gas ejection nozzle that is disposed in a through hole of the pull trigger;

a radar reflector made of a flexible material and folded inside of the case in a wrinkled state, the radar reflector including a gas injection nozzle that is placed at one end of the radar reflector and connected to the gas ejection nozzle, the radar reflector configured to inflate and exit the case when the compressed gas is injected through the gas injection nozzle, and to float in the water or in the air;

a connection cable configured to connect the case with the radar reflector;

a pull switch connected to the pull trigger and configured to move the pull trigger in a second direction such that the gas ejection nozzle approaches the gas outlet; and a press switch disposed at the case and configured to move the compressed air container such that the gas outlet enters the gas ejection nozzle.

2. The radar reflector operating device according to claim 1, further comprising:

a second detent disposed inside of the case and configured to fix the pull trigger after the pull trigger has been moved.

3. The radar reflector operating device according to claim 1, further comprising:

a third detent disposed inside of the case and configured to fix the press switch after the compressed air container has been moved.

4. The radar reflector operating device according to claim 1, wherein the pull switch protrudes from the case.

5. The radar reflector operating device according to claim 4, wherein the pull switch has a loop shape.

6. The radar reflector operating device according to claim 1, wherein a portion of the press switch protrudes from the case.

7. The radar reflector operating device according to claim 6, wherein the press switch is in contact with the compressed air container.

8. The radar reflector operating device according to claim 1, further comprising:

a spring disposed between the pull trigger and the compressed air container and configured to support the compressed air container.

9. The radar reflector operating device according to claim 1, further comprising:

a first loop disposed on the radar reflector and configured to couple the radar reflector to an object or a person.

10. The radar reflector operating device according to claim 9, further comprising:

a second loop disposed on the case and configured to couple the first loop to the case.

11. The radar reflector operating device according to claim 1, further comprising:

a wing attached to the radar reflector and folded inside of the case together with the radar reflector, the wing configured to spread out while the radar reflector is floating in the air and to cause the radar reflector to maintain a floating height.

12. The radar reflector operating device according to claim 11, wherein the wing comprises:

an air inlet through which air flows into the wing.

13. The radar reflector operating device according to claim 12, wherein the wing further comprises:

an air outlet through which the air, which has flowed into the wing through the air inlet, flows out from the wing.

14. The radar reflector operating device according to claim 11, wherein the wing has a hydrodynamic cross-section to generate a lift force while the wing spreads out.

15. The radar reflector operating device according to claim 1, wherein the case has one open end and a sodium alginate cover closes the open end by being disposed over the open end.

16. The radar reflector operating device according to claim 1, wherein the gas injection nozzle is configured to act as a unilateral valve to prevent leakage of the compressed gas that has been injected into the radar reflector.

* * * * *